2,996,389
METHOD OF MANUFACTURING POROUS CERAMIC PRODUCTS

Sven Fernhof, Sodra Promenaden 1A, Malmo, Sweden
No Drawing. Filed Mar. 13, 1959, Ser. No. 799,113
Claims priority, application Sweden Mar. 15, 1958
5 Claims. (Cl. 106—41)

This invention relates to the manufacture of lightweight, porous, ceramic building materials, such as building-bricks, insulating bricks, firebricks and the like, from raw materials which at least to the greater part consist of some kind of clay, such as ordinary clay, clay slate, kaolin, chamotte and mixtures thereof.

It is known to admix the raw material with combustible organic materials, such as sawdust, peat, cork, coal dust, charcoal dust, and the like. For practical purposes it is not as a rule possible to obtain a lower density than about 1.1.

The reason is that the workability of the raw material mixture decreases heavily at an increase of the amount of organic material admixed due to the relatively great frictional resistance of the admixing material, and that the solidity of the finished product, particularly its resistance to pressure, decreases heavily at an increase of the amount or organic material admixed.

The heavily decreasing solidity is due among other things to the admixing material preventing the natural shrinking movements of the raw material at the drying of the shaped products, whereby the finished product will obtain a very large number of small cracks. This crack formation is further increased by reason of the above-mentioned relatively great frictional resistance of the admixing material.

When so large an amount of the above-mentioned admixing materials is mixed into the raw material that the density of the finished product sinks below about 1.1, the small cracks in the finished product will lie so close as to unfavourably affect the solidity of the product.

This invention has for its object to eliminate the above-mentioned disadvantages and to provide porous ceramic products while retaining a relatively high solidity thereof.

For this purpose the present invention recommends admixing compressible bodies of plastic material with raw materials such as clay, kaolin, clay slate, chamotte and the like, and then shaping, drying and burning the mixture in the usual manner.

As the plastic bodies admixed with the raw material are compressible so as not or substantially not to prevent the shrinking of the raw material in the drying operation, the crack formation in the product is eliminated or reduced and there is a lesser decrease in the solidity of the finished product.

A still greater effect is reached, however, if the plastic bodies admixed with the raw material have smooth surfaces, as the raw material will then retain its plasticity, thanks to the small frictional resistance of the plastic bodies, and consequently its workability also at high percentages by volume of admixing material, whereby the crack formation in the product is further reduced and the decrease in the solidity of the finished product becomes still less pronounced.

According to the invention, it is preferred to admix with the raw material, bodies of blown or foamed plastic, preferably in the form of small bubbles. Examples of useful plastic materials are polystyrene plastic, phenolic plastic, polyvinyl plastics, such as polyvinyl chloride, unsaturated polyester plastics, urea plastic, polyurethane plastic, polyethylene plastic, polyisobutylene, latex rubber, silicon plastics, and cellulose derivatives such as cellulose acetates. Polystyrene plastics in the form of small bubbles are preferred. These bubbles not only are compressible but also offer an example of plastic bodies having smooth surfaces.

By the term "compressible" as used herein is understood the property of the plastic bodies employed according to the invention of letting themselves be compressed to a smaller volume when exposed to the pressure arising due to the shrinking of the clay in the drying operation.

At the use of the plastic bodies or particles according to the invention one obtains in the finished porous product a number of substantially separate, that is to say noncontinuous cells.

Depending on the type and composition of the raw material and on the use for which the finished product is intended, the diameters and compressibility of the bodies or particles admixed with the raw material can be varied within wide limits.

The products manufactured according to the invention suitably have a density of below 1.1 and preferably below 0.8. According to the invention it is possible, however, to go down to a density of about 0.4 of the finished product while retaining a satisfactory solidarity. Bricks have been manufactured according to the invention with the use of plastic bodies, the diameters of which lie within a range of 0.5 to 10 mm., with densities of the plastic bodies as low as 0.006 kg./dm.$^3$ and with densities of the porous product as low as 0.37.

To manufacture the porous ceramic products according to the invention the following procedure should preferably be adopted.

The ceramic mass used as raw material is mixed, worked and made plastic in a known manner. Possibly, it is made somewhat thinner than what is customary. The admixing material, suitably in spherical or ellipsoidal form and preferably in the form of bubbles of plastic, is worked into the ceramic mass.

It may be advantageous first to let the admixing material pass through a water bath in order that the ceramic mass may more snugly surround every body or particle of the plastic material.

The mixture is then shaped, preferably by moulding or stamping in a mould or by extrusion in a machine at a relatively low pressure. Finally, the shaped products are dried and burnt to finished products, the plastic material escaping in gaseous form.

At the admixture of the compressible plastic bodies with the clay, the latter retains its plastic workability and cohesion, also when so large amounts of plastic bodies are admixed that the final product will have a density of about 0.4. The plastic bodies can therefore easily be worked into the clay so that a homogeneous product is obtained. The retained cohesion of the clay also entails that the newly shaped product is very firm prior to the drying, which leads to a minimum amount of waste as the product will not fall to pieces when transported and otherwise handled.

One may use as raw material in the product according to the invention a non-plastic ceramic material, such as chamotte, which is bound to the raw material by means of a binder, e.g. water-glass.

If desired, the admixing material may be left out in certain portions of the raw material, for instance at the surface of the product or at certain parts of its surface so that a non-porous surface is obtained.

The following examples are given to illustrate the invention.

*Example 1.*—Water was added to a mixture of 28 parts by volume of dry clay and 72 parts by volume of polystyrene foamed plastic in the shape of bubbles with a diameter of about 1.5 mm., and the mass was worked in a mixing trough until it was supple and plastic. The mass was formed in an extruder at low pressure, was dried and burnt in the usual manner. The density of the polystyrene foamed plastic was 0.020. The burnt porous bricks had a volume weight of 0.6 and a resistance to pressure of 70 kg./cm².

Bricks made in the manner described above were placed in a water bath for 336 hours. The bricks floated on the water all the time and the water absorption did not increase during the last days. This experiment shows that the cell walls have remained whole and the cells entirely separate during the working, drying and burning.

As the polystyrene plastic did not take up water, the drying time of the moulded raw product could be reduced to less than half the time needed to dry the moulded raw product in earlier known methods of manufacturing porous ceramic products. Also the time of burning could be shortened considerably. With the use of more or less water-absorbing plastics these can be coated in a simple way with a water-repellent substance, to obtain the above-mentioned advantages at the drying and burning operations.

*Example 2.*—48 parts by volume of polystyrene foamed plastic of the same type as that used in Example 1 were worked into 52 parts by volume of plastic clay, whereupon porous bricks were made from the resulting mass as indicated in said example. These bricks had a density of 0.95 and a resistance to pressure of over 190 kg./cm². This strength is approximately twice that of porous bricks made by earlier known methods with admixture of other organic materials. It therefore appears from this experiment that an admixture of the plastic material used according to the present invention entails considerable advantages also at high volume weights.

*Example 3.*—55 parts by volume of polyurethane foamed plastic were worked into 45 parts of plastic clay, whereupon porous bricks were made in the manner indicated in Example 1. The bricks made in this way had a density of 0.8 and a resistance to pressure of 120 kg./cm².

*Example 4.*—60 parts by volume of polyvinylchloride foamed plastic were worked into 40 parts by volume of plastic clay, whereupon porous bricks were made in the manner indicated in Example 1. The bricks had a density of 0.7 and a resistance to pressure of 90 kg./cm².

*Example 5.*—60 parts by volume of polyisobutylene foamed plastic were worked into 40 parts by volume of plastic clay, whereupon porous bricks were made in the manner indicated in Example 1. The bricks had a density of 0.7 and a resistance to pressure of 80 kg./cm².

What I claim and desire to secure by Letters Patent is:

1. A method of manufacturing lightweight ceramic products which comprises: (1) forming a wet moldable mass of clay and particulate, combustible, compressible artificial resin filler, the particles of which have a compressibility at least equal to the shrinkage factor of the clay during drying; (2) forming the mass into the required shape; (3) drying the mass, and (4) firing, thereby causing combustion of the resin filler particles and obtaining a shaped ceramic product free from cracks and with particulate separate, non-continuous pores.

2. A method according to claim 1 wherein the compressibility of the artificial resin particles is greater than the shrinkage factor of the clay during the drying operation.

3. A method according to claim 1 in which the artificial resin particles are in the form of hollow balls.

4. A method according to claim 1 in which the artificial resin particles are in foamed form.

5. A method according to claim 1 in which the artificial resin particles have a smooth polished surface.

References Cited in the file of this patent

UNITED STATES PATENTS

| | | |
|---|---|---|
| 1,669,363 | Watson | May 8, 1928 |
| 1,985,737 | Mayr | Dec. 25, 1934 |
| 2,729,570 | Nichols | Jan. 3, 1956 |
| 2,797,201 | Veatch et al. | June 25, 1957 |

FOREIGN PATENTS

| | | |
|---|---|---|
| 479,178 | Canada | Dec. 11, 1951 |